(12) United States Patent
Hong (10) Patent No.: US 7,400,626 B2
(45) Date of Patent: Jul. 15, 2008

(54) PROCESSING A DUPLICATE DATA PACKET

(75) Inventor: Jun-Hyuk Hong, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 1035 days.

(21) Appl. No.: 10/321,672

(22) Filed: Dec. 18, 2002

(65) Prior Publication Data

US 2003/0231596 A1 Dec. 18, 2003

(30) Foreign Application Priority Data

Dec. 24, 2001 (KR) .................... 10-2001-0084353

(51) Int. Cl.
*H04L 12/28* (2006.01)
(52) U.S. Cl. .................... 370/392; 370/474
(58) Field of Classification Search .............. None
See application file for complete search history.

(56) References Cited

U.S. PATENT DOCUMENTS

| 6,490,259 | B1 * | 12/2002 | Agrawal et al. | ............. 370/331 |
|---|---|---|---|---|
| 6,714,559 | B1 * | 3/2004 | Meier | ............. 370/449 |
| 6,751,746 | B1 * | 6/2004 | Jain et al. | ............. 714/4 |
| 6,831,898 | B1 * | 12/2004 | Edsall et al. | ............. 370/256 |
| 6,856,599 | B1 * | 2/2005 | Kroon | ............. 370/236 |
| 6,873,618 | B1 * | 3/2005 | Weaver | ............. 370/390 |
| 6,909,698 | B1 * | 6/2005 | Moon | ............. 370/252 |
| 2003/0112780 | A1 * | 6/2003 | Ouyang et al. | ............. 370/338 |

* cited by examiner

*Primary Examiner*—Wing F. Chan
*Assistant Examiner*—Michael J Moore, Jr.
(74) *Attorney, Agent, or Firm*—KED & Associates, LLP (57) ABSTRACT

Embodiments of the present invention relate to a method. The method includes a step of receiving a bundle of data (i.e., a frame). The method also includes a step of verifying if content of the bundle of data was previously received in a previously received bundle of data. The verifying comprises checking at least two types of information. In other words, embodiments of the present invention include a procedure for discarding a duplicate packet. These procedures ensure that a subsequent packet is actually a duplicate packet and not a new packet by checking at least two types of information associated with the device receiving the packet and the data in the packet. Accordingly, embodiments of the present invention provide for a communication system with minimal data loss. In turn, the embodiments of the present invention provide for a communication system which can communicate data without frustrating an end user due to an incompletion of a data request, such as accessing a web page on the Internet.

28 Claims, 4 Drawing Sheets

PROCESSING A DUPLICATE DATA PACKET

BACKGROUND OF THE INVENTION

1. Field of the Invention

The present invention relates to a method for processing a duplicate data packet.

2. Background of the Related Art

Communication systems are used in everyday life. For instance, watching television requires a broadcast communication system. Talking on the telephone requires a telecommunication system. Conducting a conversation on a cellular phone requires a wireless communication system. Surfing the Internet requires a data communication system. Many of these communication systems are actually digital communication systems. A digital communication system breaks up data (i.e., sound signals, TV broadcasts, web page data) into ones and zeros. These ones and zeros are transmitted throughout the respective communication system and eventually reassembled to reproduce an originating signal.

Communicating these ones and zeros across communication networks is a significant task. In some communication systems, these ones and zeros are bundled together in the form of a packet. A packet can be directed through a communication network between two users or systems, as they are communicating.

Unfortunately, communication systems are not perfect. Mistakes do occur that result in loss of these packets. This can be a significant problem, as sometimes the lost packets contain data which is vital to communication. For example, if a user is surfing the Internet and enters a world wide web address into an Internet browser, that address is converted into ones and zeros and transmitted across a communication network in order to retrieve the desired web page. However, if a packet containing these ones and zeros that are associated with the web address is lost in the communication network, the user will be unable to complete the communication and view the desired web page. Accordingly, there is a long felt need to improve communication systems, such that data is not lost in the network.

SUMMARY OF THE INVENTION

Objects of the present invention at least include overcoming the disadvantages of the background art. Embodiments of the present invention relate to a method. The method includes a step of receiving a bundle of data (i.e., a frame). The method also includes a step of verifying if content of the bundle of data was previously received in a subsequently received bundle of data. The verifying comprises checking at least two types of information.

In other words, a communication system may send packets of data several times in order to ensure that at least one of the packets of data reaches its intended destination. However, once one of these packets is received at the destination, any subsequent duplicate packet is no longer needed. In fact, any subsequent packet may actually cause confusion in the communication network. Accordingly, embodiments of the present invention include procedures for discarding this duplicate packet. These procedures ensure that a subsequent packet is actually a duplicate packet and not a new packet by checking at least two types of information associated with the device receiving the packet or the data of the packet. Accordingly, embodiments of the present invention provide for a communication system with minimal data loss. In turn, the embodiments of the present invention provide for a communication system which can communication data without frustrating an end user due to incompletion of a data request, such as accessing a web page on the Internet.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

Asynchronous Transfer Mode (ATM) may be composed of four layers (a higher layer, ATM adaptation layer, ATM layer and a physical layer). The structure of an ATM protocol may follow an OSI reference model. ATM may have a structure that is formed by expanding a N-ISDN protocol. Respective layers of ATM have specific performances. Service of these respective layers is implemented using a service of a lower layer. An upper layer may not affect the lower layer. A lower layer may include a physical layer, an ATM layer, and an ATM adaptation layer.

In an ATM layer, an AAL layer (ATM Adaptation Layer) may provide user service information, conversion among ATM cells, compensation of cells which are damaged by transmission error or congestion, transmission or restoration of time information, and multiplexing or demultiplexing. When an AAL is divided vertically, it is divided into a Segment and Disassembly Sublayer (SAR) and a Convergence Sublayer (CS). A SAR may be formed by disassembling and assembling a data unit in a unit of a cell. A CS may verify effectiveness of a data unit and transmit the result to an upper layer. When the AAL is divided in parallel, it can be divided into an AAL1 (which supports B-ISDN service class A), AAL2 (which supports B-ISDN service class B), AAL3 (which supports B-ISDN service class C), AAL4 (which supports B-ISDN service class D), and AAL5 (which supports a high speed data communication having simplified performances from the performance of AAL3/4).

The AAL2 transmits U-SDU (User-Service Data Unit) of real time service data (Audio or Video data) and provides time information, error restoration and information services to the upper layer. Also, the AAL2 provides division of user information, reassemble, cell insertion and restoration of damaged cells. In the AAL2, a CPS (Common Part Sublayer) packet may be generated for AAL2. Signaling may be divided into three types (Type 1, Type 2 and Type 3 packets). A Type 1 is a packet that may be used for transmitting voice. Accordingly, there may be no need to detect errors or correct errors of a Type 1 packet. A Type 3 packet is used to transmit call control information. Call control information may include dialed digits, CAS (Channel Associated Signaling), Facsimile Demodulation Control, Alarms, and User State Control. One of ordinary skill in the art would appreciate that other types of information may be included in the call control information.

Damage to a call control signal packet (Type 3 packet) or packet error can cause more serious problems than that of voice packets (Type 1 packet). To solve the above problem, in embodiments of the present invention, an ATM may use a Redundancy function that entails repeatedly transmitted similar Type 3 packets including identical content multiple times at a predetermined time interval. For example, an ATM may repeatedly transmit a Type 3 packet three times. A call control signal packet (Type 3 packet) which is transmitted according to a Redundancy function may secure some reliability of the system. Transmitting Redundancy packets may cause a master processor of an ATM sender and receiver to be over burdened due to a necessity of processing content-identical packets several times. To reduce this burden on the master processor, an ATM sender and receiver may have a packet processing unit for reporting only new packets to a master processor and discard redundant packets.

Figure 1:
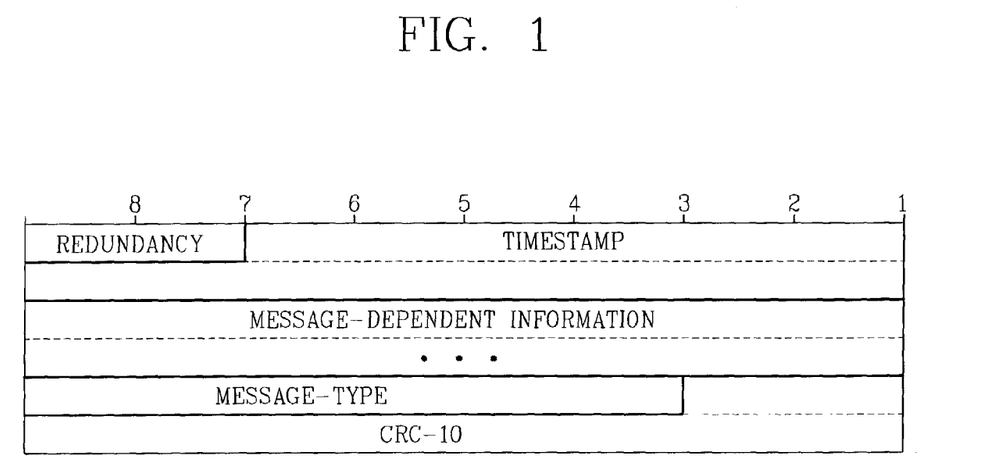
FIG. 1 is an exemplary view illustrating a Type3 packet.

FIG. 1 illustrates an exemplary Type 3 packet which may include a Redundancy field, TimeStamp field, Message Dependent Information field, message-type field and/or CRDC (Cyclic Redundancy Check) field. A Redundancy field is a region that may identify redundancy packets according to a Redundancy function. For instance, when a packet is repeatedly transmitted 3 times, ordering values (0, 1 and 2) may be inputted in a Redundancy field. Input values of a field may be binary values of 2 bits ($00_{(2)}$, $01_{(2)}$, $10_{(2)}$ and $11_{(2)}$) and among them, 3 ($11_{(2)}$) may be used for another object.

A TimeStamp field is a region that may indicate a 'relative point in time' that the respective packet was processed in a sender system. Redundancy packets identify this same relative point in time value in each respective TimeStamp field. A receiver may determine whether a received packet is a redundancy packet or a packet of a new event by checking a TimeStamp field of the received packet. A size of a TimeStamp field may be 14 bits. The value of a TimeStamp field may be increased 1 by 1 in a unit of milliseconds and reset as 0 again every 16.4 seconds.

A Message-dependent information field is a region which may indicate information related to an event. A message-type field is a region which may indicate identification values of respective events. A CRC field may be used to detect errors of a Type 3 packet and determine whether there is an error in a received packet by comparing the CRC field value and a CRC value calculated by a receiver. An event may be call control signals related to a call setting, maintaining and disconnecting, namely, Hook-on, Hook-off, Hook-flash. One of ordinary skill in the art would appreciate other functional information that can be included in an event.

Figure 2:
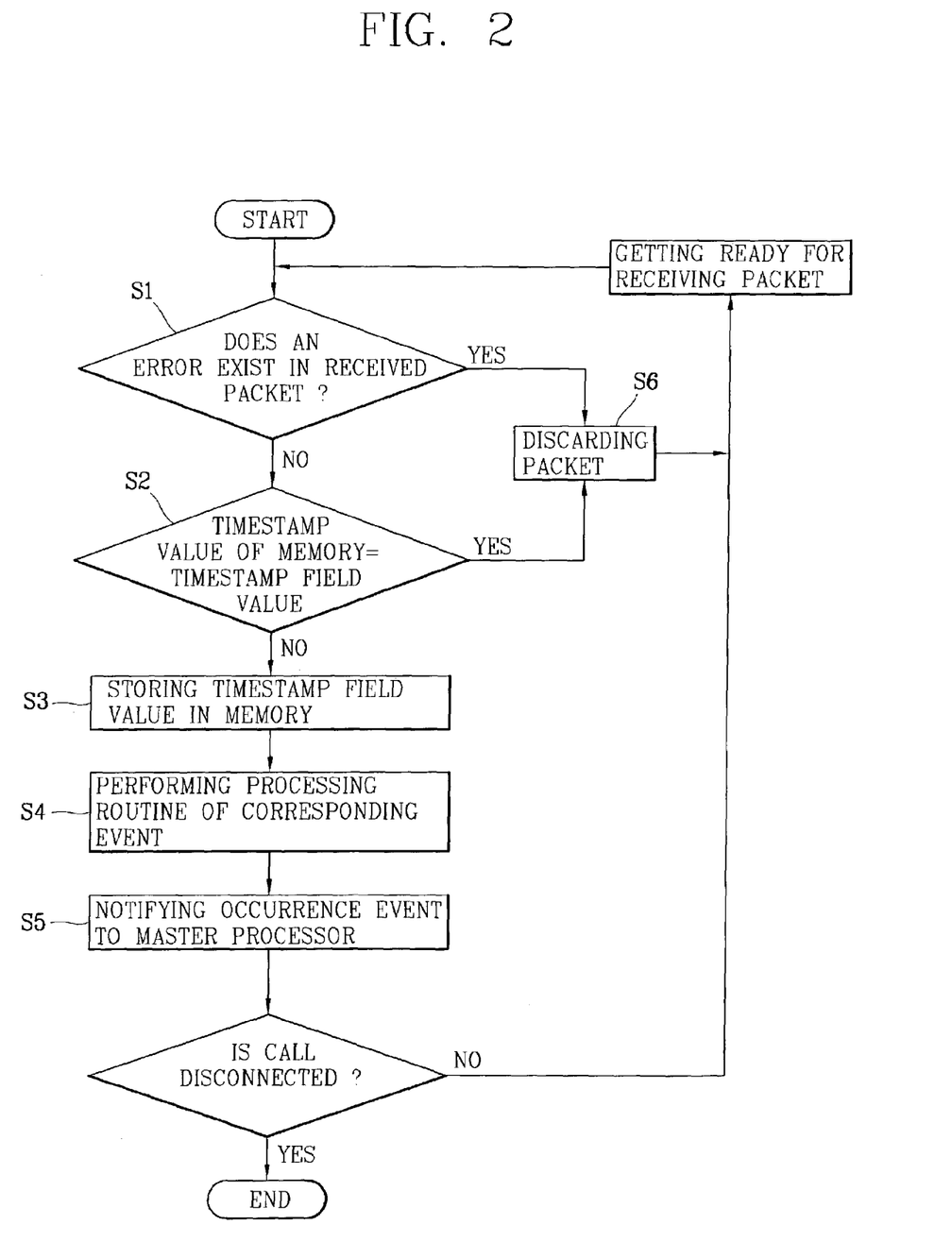
FIGS. 2 and 3 are exemplary flow charts illustrating Type3 packet processing.

FIG. 2 is an exemplary flow chart illustrating Type 3 packet processing. When ATM cells are received, a receiver may process a call control signal packet (Type 3 packet) by dividing out a voice packet (i.e., Type 1 packet). That is, a Type 3 packet may be processed according to a Type 3 packet processing routine by extracting the Type 3 packet.

After a packet is received, a packet processing unit may first check if there is an error in the packet by refering to a CRC (Cyclic Redundancy Check) field of a received packet (step S1). If there is an error, a packet processing unit may discard a received packet (step S6). If there is no error in a received packet, a packet processing unit compares a TimeStamp value of a received packet and a TimeStamp value written in memory (step S2). A TimeStamp value written in memory is a TimeStamp value of a packet which was previously processed by a master processor. After the comparison of step S2, if a TimeStamp value of a received packet and a TimeStamp value written in a memory are identical, then a packet processing unit may discard the received packet (step S6). If a TimeStamp value of a received packet is different from a TimeStamp value written in a memory, then a packet processing unit may overwrite the TimeStamp value of the received packet in the memory (step S3), and may process an event of the received packet according to an event processing routine (step S4). Event information of a received packet may be reported to a master processor (step S5).

In other words, when an event occurs, a sender side may transmit information about an event by loading it in a Type 3 packet. "Identical" Type 3 packets may be transmitted according to a Redundancy function. Such a redundancy transmission is in anticipation of errors in a Type 3 packet or the Type 3 packet is damaged. The transmitted "Identical" packets have identical contents, and may only have differences in Redundancy field values. A packet which is initially transmitted to a receiver may be referred to as a "new packet". Packets which are transmitted after an initial packet (or new packet) may be referred to as a "redundancy packet". For a receiver, identical Type 3 packets may be transmitted three times per event. If there was no damaged packets, Redundancy value of a "new packet" may be "$00_{(2)}$" and Redundancy values of two redundancy packets may be "$01_{(2)}$" and "$10_{(2)}$".

During transmission, if a "new packet" is damaged or an error occurs, a receiver may not discard subsequent redundancy packets. However, if a "new packet" is received successfully, a packet processing unit of a receiver may determine whether the received packet is a "redundancy packet" or a "new packet" using a TimeStamp value. A TimeStamp value is a relative time value of a sender system and the TimeStamp value of a "new packet" and TimeStamp value of a "redundancy packet" may be identical. A packet processing unit may receive a "new packet" and when it is checked that there are no errors in the "new packet", the packet processing unit may overwrite a TimeStamp value of the packet and report packet information to a master processor. Packet processing unit may then check a TimeStamp value which was received after receiving a "new packet" and discard the received packet if the TimeStamp value is identical to a TimeStamp value stored in memory.

For example, a new packet may be misconceived as a redundancy packet and discarded. Likewise, a redundancy packet may be misconceived as a new packet and erroneously reported to a master processor. In fact, the probability that two received packets, which are actually not identical, have an identical TimeStamp value is $\frac{1}{2}^{14}(\frac{1}{16384})$. This may be a very high rate as an erroneous processing occurrence probability. In other words, a packet is erroneously processed every 16384 packets.

Figure 3:
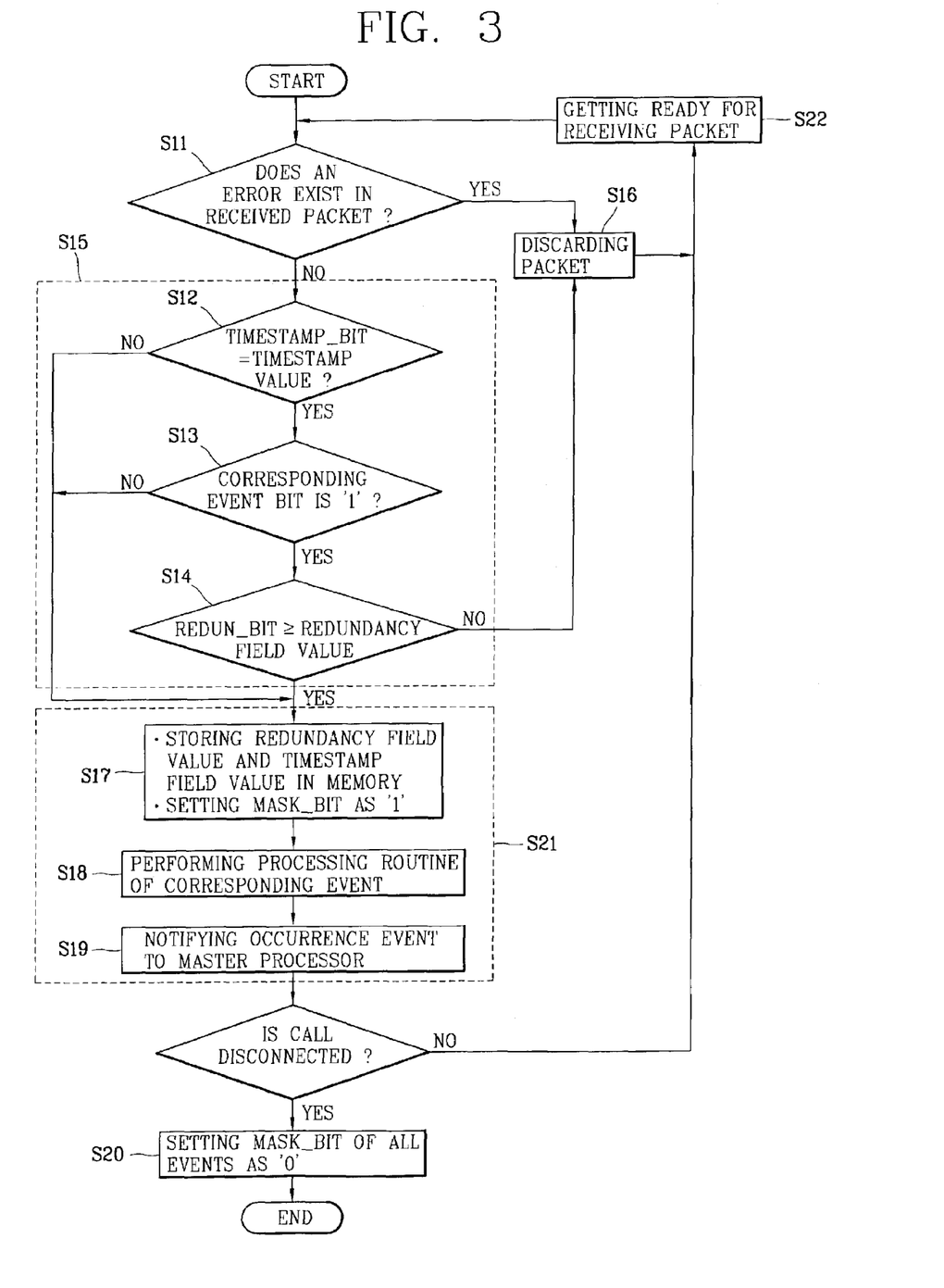

FIG. 3 is an exemplary flow chart illustrating Type 3 packet processing in accordance with embodiments of the present invention. A Type 3 packet processing method used in AAL2 signaling in accordance with embodiments of the present invention may include the following steps. Checking errors of a received packet (step S11). Determining whether a received packet is a redundancy packet or a new packet by comparing a plurality of values of the corresponding packet and stored information. If there is no error in a received packet (step S15) then a field value of the corresponding field in a memory is overwritten if the received packet is a new packet and the new packet is reported to a master processor (step S21). Step S21 may include the following steps. Storing a Redundancy value and a TimeStamp value. Setting a History-bit of a corresponding event as in active state '1' (step S17). Processing an event of an identified received packet according to an event processing routine (step S18). Reporting a received packet information to a master processor and checking whether a call was disconnected (step S19).

Step S15 may include the following steps. Comparing a TimeStamp value of a received packet with a TimeStamp value which is stored in a memory (step S12). Checking whether a History-bit of a corresponding event in a memory is an active state value ('1') after identifying kinds of events of a received packet. If these TimeStamp values are identical (step S13), then comparing a Redundancy value of a received packet with a Redundancy value which is stored in a memory. If a History-bit is in an active state value ('1'), then determining that a received packet is a new packet if the Redundancy value of the received packet is smaller or the same as a stored Redundancy value. In step S12, if two TimeStamp values are different, a packet processing unit determines that the received packet is a new packet. In step S13, if a History-bit of a corresponding event is in an inactive state value ('0'), a packet processing unit determines that a received packet is a new packet. In step S14, if a Redundancy value of a received packet is larger than a redundancy value which is stored in a memory, a packet processing unit discards the received packet (step S16). In step S19, when it is confirmed that a call was not disconnected, a packet processing unit sets a initial value '0' in the mask-bit region of memory (step S20).

Figure 4:
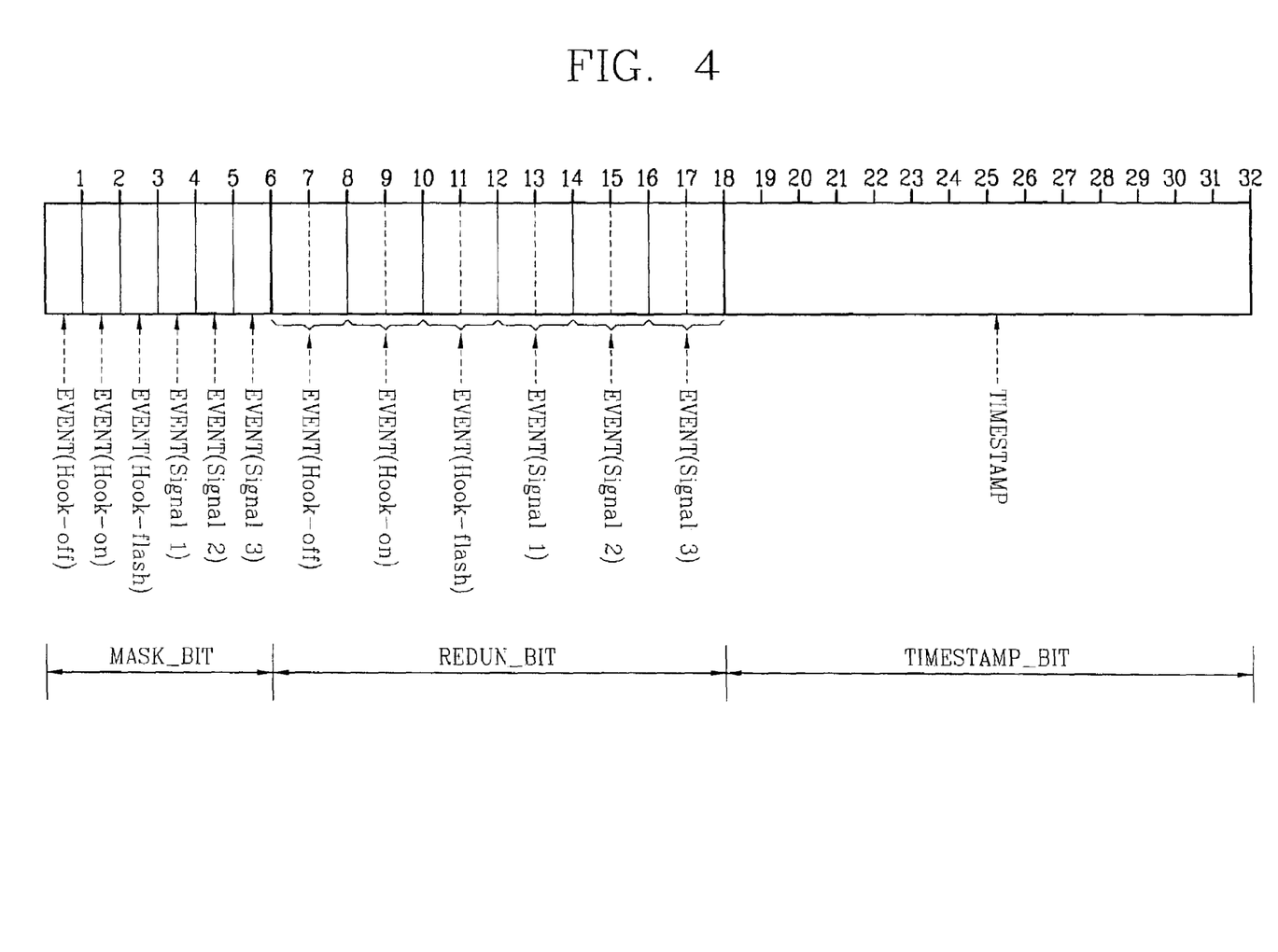
FIG. 4 is an exemplary structure diagram illustrating a memory which may be allotted to each ATM channel.

FIG. 4 is an exemplary structure diagram illustrating a memory allotted to an ATM channel. The memory region shown in FIG. 4 is composed of a mask-bit region ( first region) having a maximum of 6 bits, Redun-bit region (second region) having a maximum of 12 bits, and TimeStamp-bit region (third region) having a maximum of 14 bits. The memory region may be allotted to respective ATM channels and size of the memory allotted to each channel may be 32 bits. The mask-bit region may include a plurality of 1 bit event History-bits. Event History-bit may have an inactive state value '0' as an initial value. When a "new packet" is received from a sender, a History-bit value of a corresponding event may be set as active state value '1'. Therefore, an event History-bit of '0' means that a corresponding event has not yet occurred or a packet of the corresponding event has not been received.

In embodiments of the present invention, a size of a mask-bit region may be as 6 bits. However, since the number of bits of a mask-bit region may be equal to the number of events, the size of the mask-bit region may be expanded or reduced according to the number of events. For example, three kinds of events may be Hook-off, Hook-on, and Hook-flash. In this example, mask-bit region may be 3 bits; one bit for Hook-off, one bit for Hook-on, and one bit for Hook-flash.

A TimeStamp-bit region may have an identical size (14 bit) as a TimeStamp field of a Type 3 packet. A TimeStamp value of a packet which is most recently reported to the master processor, may be overwritten to the TimeStamp-bit region. When a packet is received, a packet processing unit may compare the TimeStamp value of a received packet with a value which is written in the TimeStamp-bit region of a memory. Redun-bit region may include a plurality of event regions of identical size (2 bits) as a Redundancy field of a packet and a packet processing unit may write a Redundancy value of a "new packet" in a corresponding event region of a memory when the "new packet" is received.

In embodiments of the present invention, size of a Redun-bit region is a maximum of 12 bits. However, the number of bits of the Redun-bit region of a respective ATM channel can be expanded or reduced in accordance with the number of events. For example, if an event is divided into Hook-off, Hook-on, and Hook-flash (three kinds of events), the Redun-bit region may be 6 bits, two bits are for Hook-off, and two bits are for Hook-flash.

In an ATM, a sender may send a packet in several millisecond intervals. The transmitted packet can be lost or damaged in the transmission path. However, the order in which a packet arrives at a receiver may not be changed, since an ATM is connection-Oriented. For example, after a packet having a Redundancy value of '1' is transmitted to a receiver, the subsequent packet includes identical event information and has a Redundancy value of '1'. A packet processing unit may regard the received packet as a "new packet". Accordingly, the TimeStamp-bit region and Redun-bit region are not used reset to the initial value, even if the corresponding call is disconnected. FIGS. 3 and 4 illustrate an exemplary process for processing a Type 3 packet. For example, an event may be divided into three types (Hook-on, Hook-off and Hook-flash). The received packet may be associated with Hook-off and the number of the ATM channels may be 2048. A memory region of 23 bits may be allotted to each channel and a memory region of respective channels may be a mask-bit region of 3 bits, Redun-bit region of 6 bits, and TimeStamp region of 14 bits. All values of the memory region is set as '0' (initial value).

When ATM cells are transmitted to the receiver side through an ATM network, a receiver may process the ATM cells by dividing them into ATM cells carrying voice data and ATM cells carrying call control information. A receiver may extract Type 3 packets from an ATM cell carrying call control information. The extracted packet may be determined to be a "redundancy packet" or a "new packet" by a packet processing unit. If the extracted packet is a "redundancy packet", the packet may be discarded. If the extracted packet is a "new packet", the packet processing unit may overwrite information of the "new packet" (i.e., TimeStamp value, message-type information and Redundancy value) in a memory and report occurrence of an event to a master processor.

When a received (extracted) packet is inputted into a packet processing unit, the packet processing unit tests whether there are errors in the packet by checking a CRC field of the packet (step S11). If an error is found, the packet processing unit discards the packet (step S16). The CRC code may be CRC-10. If no error is found, the packet processing unit may compare the TimeStamp value of the received packet and the TimeStamp value stored in the memory (step S12). If the two TimeStamp values are identical, additional information about the received packet (message-type information and Redundancy value) is compared with the information (mask-bit region value and Redun-bit region value) which is overwritten in the memory region.

For example, if the two TimeStamp values are identical, the packet processing unit may examine a History-bit of a corresponding event (Hook-off) in the mask-bit region with reference to the message-type field (event identifier of 'Hook-off') of the received packet S13. If the History-bit of the corresponding event indicates an active state, (i.e., has a value of '1'), the packet processing unit compares the Redundancy value of the received (extracted) packet with the Redundancy value written in memory (step S14). As the result of the comparison in step S14, if the Redundancy value of a received (extracted) packet is larger than the Redundancy value written in memory, then the packet processing unit discards the received packet (step S16). As a result of the comparison S12, if the two compared TimeStamp values are different, the packet processing unit may designate the received packet as a "new packet" (step S21). As a result of the examination in S13, if the History-bit of the corresponding event Hook-off is under the inactive state, (i.e., has a value of '0'), the packet processing unit may designate the received packet as a "new packet" and perform step S21. Also, as a result of the examination in S14, if a Redundancy value of the received (extracted) packet is equal to or less than a Redundancy value stored in memory, then the packet processing unit designates the received packet as a "new packet" and performs step S21.

When a packet processing unit determines that a received packet is a "new packet", it may store information (i.e., TimeStamp value and Redundancy value) of the "new packet" in a memory region to enable the discarding of a redundancy packet. Further, the packet processing unit may set an active state value '1' in a corresponding event bit of a mask bit region (step S17). According to an event processing routine, a packet processing unit may process an event of a received packet (step S18). The packet processing unit may report event information of a received packet to a master processor (step S19). Contents of event information may be different for different systems.

After reporting event information to a master processor, a packet processing unit may check whether a call is disconnected. If the call is not disconnected, it may convert the state (i.e., active state or inactive state) in anticipation of subsequent packets (step S22). If a call was disconnected, a mask-bit region of memory may be initialized. An inactive state value of '0' may be set in all event History-bits of a mask-bit region (step S20). However, TimeStamp-bit region and Redun-bit region may not be set to the initial value even if the call is disconnected.

Embodiments of the present invention utilizing checking of at least two types of information may have an erroneous processing occurrence probability of $1/2^{14} \times 1/2048 \times 1/2 \times 3/9 \times 2 = 1/100,663,269$. A memory region (32 bit) is allotted to each channel (2048 channels) and it uses the TimeStamp-bit region (14 bit), mask-bit region (event region of 1 bit) and Redun-bit region (event region of 2 bit). This means that a packet may be misconceived only once among more than 100 million packets.

If the generation order of each event is determined, erroneous processing occurrence probability can be further reduced. That is, in case a normal call, since a Hook-on event must occur after the Hook-off event occurs, when the Hook-off bit value of the mask-bit region is '0', if the Type 3 packet of the Hook-on is received, the packet can be determined whether it is a redundancy packet or new packet just by comparing the TimeStamp value. As described above, the Type 3 packet processing method in accordance with embodiments of the present invention implement a Redundancy function that concretely, efficiently, and substantially reduces erroneous processing occurrence probability in a process of determining redundancy packet of a ATM receiver. Embodiments of the present invention relate to a process for determining if a packet is a redundancy packet or a new packet that can be performed more precisely and efficiently by allotting memory for processing the Type 3 packets for each ATM channel. The memory region can be expanded and reduced according to the number of events.

Therefore, an object of the present invention is to provide a method for processing a Type3 packet used in AAL2 signaling, capable of decreasing a rate of erroneous processing occurred in processing the Type3 packet and performing identification process of redundancy packet and new packet more accurately and efficiently.

To achieve these and other advantages and in accordance with the purpose of the present invention, as embodied and broadly described herein, there is provided a method for processing a Type 3 packet used in AAL2 signaling, including the steps of checking errors of a received packet S11, determining whether the received packet is a redundancy packet or new packet by comparing the plurality of field values of the corresponding packet and stored information, if there is no error in the received packet S15 and overwriting the field value of the corresponding field in a memory if the received packet is a new packet and reporting to a master processor S21.

The reporting step S21 includes the steps of storing a Redundancy value and TimeStamp value, and setting a History-bit of the corresponding event as an active state '1' S17, processing the event of the identified received packet according to event processing routine S18 and reporting the received packet information to a master processor and checking whether a call was disconnected S19.

The step of determination S15 includes the steps of comparing the TimeStamp value of the received packet with the TimeStamp value which is stored in the memory S12, checking whether the History-bit of the corresponding event in the memory is under the active state after identifying kinds of events of the received packet, if the two TimeStamp values are identical S13, comparing a Redundancy value of the received packet with the Redundancy value which is stored in the memory, if the History-bit is under the active state '1' and determining that the received packet is a new packet if the Redundancy value of the received packet is smaller or same as the stored Redundancy value.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method comprising:
    receiving a bundle of data at a device; and
    verifying if content of the bundle of data was previously received in a previously received bundle of data by checking at least two types of information, wherein checking the at least two types of information comprises:
        comparing time stamp information comprised in the bundle of data with time stamp information stored in the device, wherein the time stamp information stored on the device is time stamp information from the previously received bundle of data,
        when the time stamp information in the bundle of data is the same as the time stamp information stored in the device, then checking an event bit stored on the device, wherein the event bit indicates whether the device is in an active state or an inactive state, and
        when the time stamp information in the bundle of data is not the same as the time stamp information stored in the device, then determining that the received bundle of data is a new bundle of data.

2. The method of claim 1, wherein the bundle of data comprises a packet.

3. The method of claim 1, wherein the content of the bundle of data comprises call control information.

4. The method of claim 3, wherein the call control information comprises at least one of dialed digits, channel associated signaling, facsimile demodulation control, alarms, and user state control.

5. The method of claim 1, wherein the bundle of data comprises a common part sublayer packet.

6. The method of claim 5, wherein the common part sublayer packet is in conformance with an asynchronous transfer mode adaptation layer.

7. The method of claim 6, wherein the asynchronous transfer mode adaptation layer is AAL2.

8. A method comprising:
receiving a bundle of data at a device; and
verifying if content of the bundle of data was previously received in a previously received bundle of data by checking at least two types of information, wherein checking the at least two types of information comprises:
checking an event bit stored in the device that received the bundle of data, wherein the event bit indicates whether the device is in an active state or in an inactive state, and
if the checked event bit indicates the active state, then comparing a magnitude of a redundancy field included in the bundle of data with a magnitude of a redundancy field stored in the device that received the bundle of data, wherein the magnitude of the redundancy field stored in the device corresponds to the magnitude of the redundancy field from a previously received bundle of data.

9. A method comprising:
receiving a bundle of data; and
verifying if content of the bundle of data was previously received in a previously received bundle of data, by checking at least two types of information, wherein checking the at least two types of information comprises:
checking a time stamp of the bundle of data against a time stamp stored on a device that received the bundle of data;
if the time stamp of the bundle of data is identical to the time stamp stored on the device, then checking an event bit indicating if the device is in an active state or in an inactive state;
if the device is in the active state, then checking a magnitude of a redundancy field of the bundle of data against a magnitude of a redundancy field stored on the device; and
if the magnitude of the redundancy field of the bundle of data is greater than the magnitude of the redundancy field stored on the device, then discarding the bundle of data.

10. An apparatus comprising:
memory for storing a received data packet; and
means for checking at least two types of information to verify if content of the data packet was previously received in a previously received data packet, wherein the means for checking compares time stamp information from the data packet with stored time stamp information from the previously received data packet,
wherein when the time stamp information in the data packet is the same as the time stamp information stored in the memory, then the means for checking checks an event bit stored in the memory, wherein the event bit indicates whether the apparatus is in an active state or in an inactive state, and
when the time stamp information in the data packet is not the same as the time stamp information stored in the memory, then the apparatus determines that the received data packet is a new data packet.

11. A type 3 packet processing method used in AAL2 signaling, comprising:
checking errors of a received packet;
determining whether the received packet is a redundancy packet or a new packet by comparing a plurality of field values of a corresponding packet and stored information, if there is no error in the received packet; and
storing a field value of a corresponding field in a memory if the received packet is a new packet and reporting to a master processor, wherein the determining includes:
comparing a TimeStamp value of the received packet with a TimeStamp value stored in the memory,
checking whether a History-bit of the corresponding event in the memory is an active state value after identifying kinds of events of the received packet, if the two TimeStamp values are identical,
comparing a Redundancy value of the received packet with a Redundancy value stored in the memory, if the History-bit is the active state value, and
determining that the received packet is a new packet if the Redundancy value of the received packet is smaller than or the same as the stored Redundancy value.

12. The method of claim 11, wherein the packet includes: a Redundancy field; a TimeStamp field; a message-dependent information field; a message-type field; and a CRC field.

13. The method of claim 11, wherein the plurality of field values are Redundancy value, TimeStamp and message-type values of packets.

14. The method of claim 13, wherein the message-type values refer to kinds of events of received packets.

15. The method of claim 11, wherein the received packet is determined as a new packet if the two TimeStamp values are different.

16. The method of claim 11, wherein the received packet is determined as a new packet if the History-bit of the corresponding event is an inactive state value.

17. The method of claim 11, wherein the received packet is discarded if the Redundancy value of the received packet is larger than the Redundancy value stored in the memory.

18. The method of claim 11, wherein the memory includes:
a first region composed of a plurality of event History-bits;
a second region composed of a plurality of event regions of an identical size with the Redundancy field; and
a third region having an identical size with the TimeStamp field.

19. The method of claim 18, wherein an initial value of the event History-bit is an inactive state value and when a new packet is received, the value is changed to an active state value.

20. The method of claim 18, wherein each region of the memory is expanded or reduced according to a number of the events.

21. The method of claim 18, wherein the reporting includes:
storing a Redundancy value and a TimeStamp value, and setting a History-bit of a corresponding event as an active state;
processing an event of the identified received packet according to event processing routine; and
reporting the received packet information to a master processor and checking whether a call was disconnected.

22. The method of claim 18, wherein a first region of the memory is initialized, if it is confirmed that the call was disconnected.

23. The method of claim 1, wherein the time stamp information relates to a time that the bundle was processed.

24. The apparatus of claim 10, wherein the time stamp information relates to a time that the packet data was processed.

25. The method of claim 1, wherein when the checked event bit indicates the active state, then checking the at least two types of information further comprises:

checking a magnitude of a redundancy field of the bundle of data and a magnitude of a redundancy field on the device.

26. The method of claim 25, wherein when the checked event bit indicates the active state, then checking the at least two types of information further comprises:

if the magnitude of the redundancy field of the bundle of data is greater than the magnitude of the redundancy field stored on the device, then discarding the bundle of data.

27. The apparatus of claim 10, wherein when the checked event bit indicates the active state, then the means for checking checks a magnitude of a redundancy field of the data packet and a magnitude of a redundancy field in the memory.

28. The apparatus of claim 27, wherein when the checked event bit indicates the active state and if the magnitude of the redundancy field of the data packet is greater than the magnitude of the redundancy field stored in the memory, then the data packet is discarded.

* * * * *